Feb. 13, 1940.   A. W. DONOVAN   2,190,512
MANUFACTURE OF FOOTWEAR
Filed Jan. 8, 1938   5 Sheets-Sheet 1
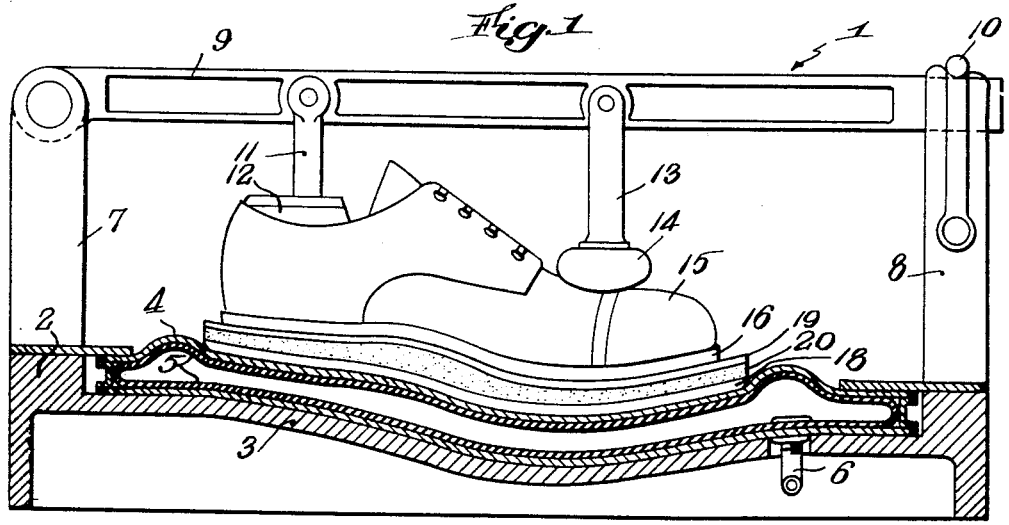
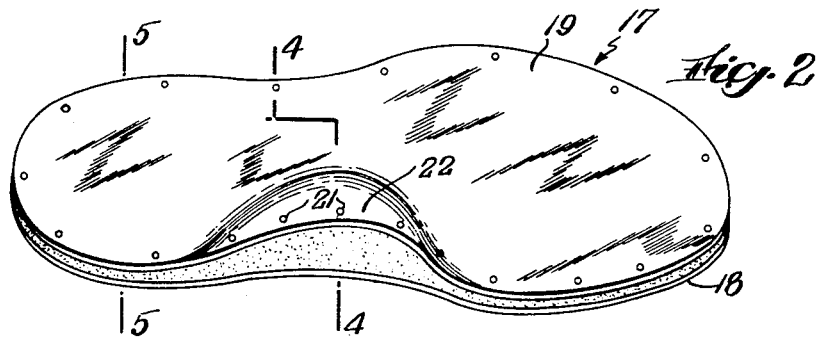
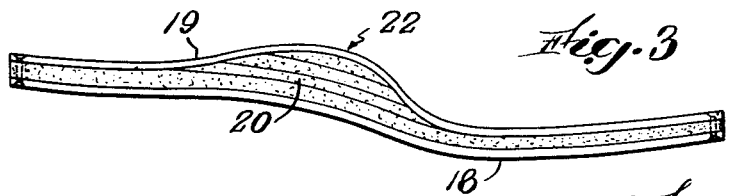
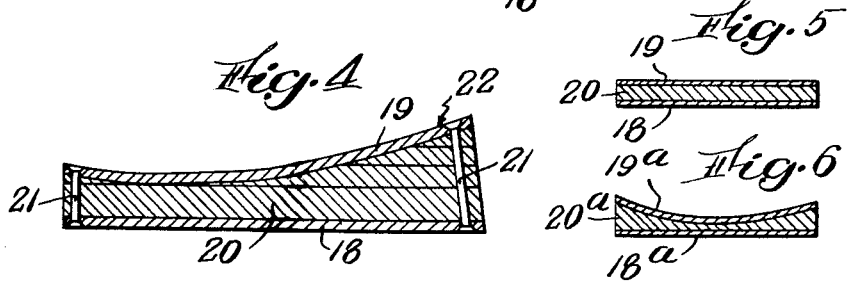
Inventor
Alfred W. Donovan
by Roberts Cushman Woodberry
Attys.

Feb. 13, 1940. A. W. DONOVAN 2,190,512
MANUFACTURE OF FOOTWEAR
Filed Jan. 8, 1938 5 Sheets-Sheet 2
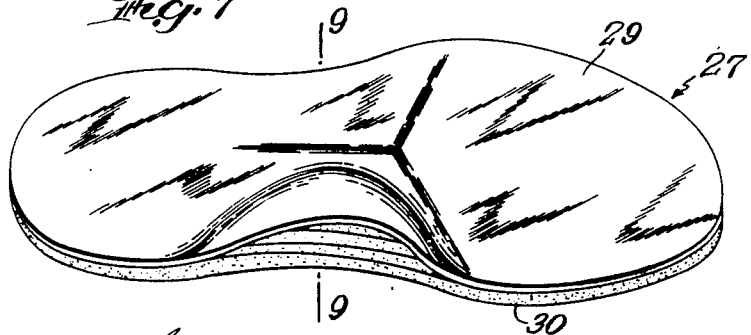
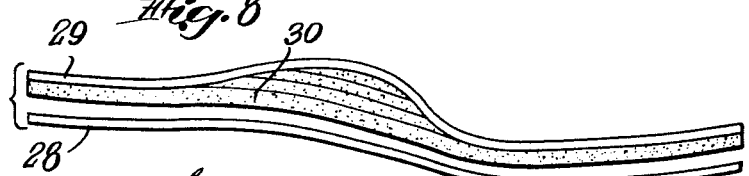
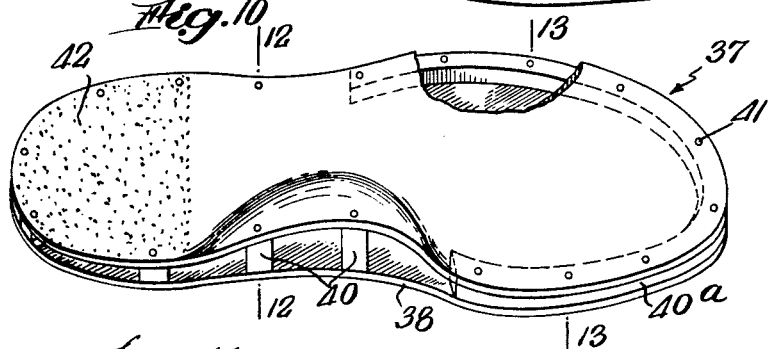
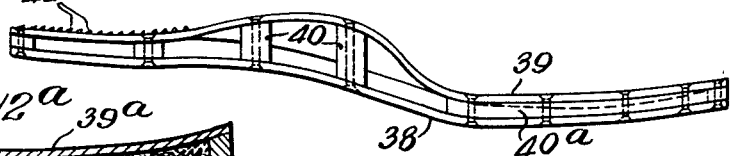
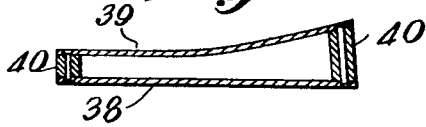
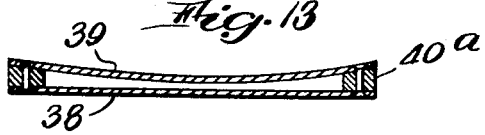
Inventor:
Alfred W. Donovan

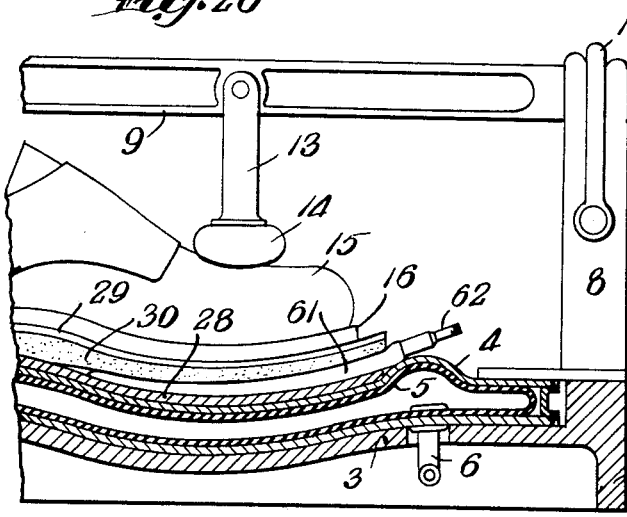
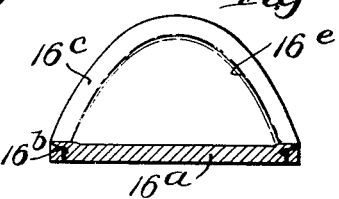
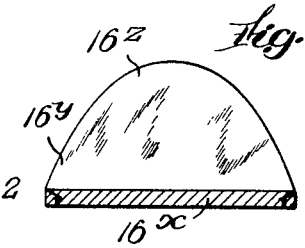
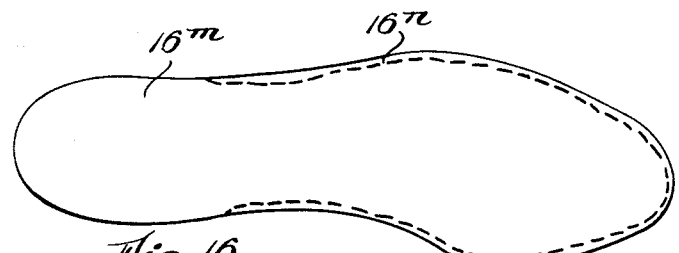
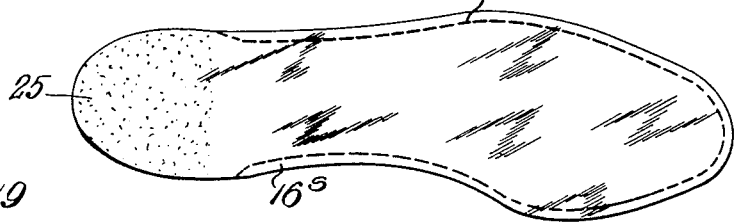
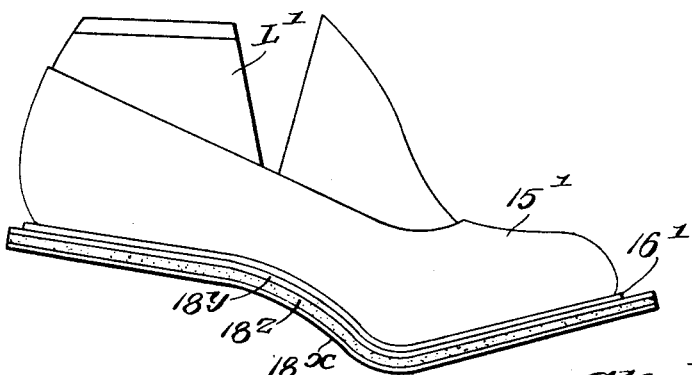
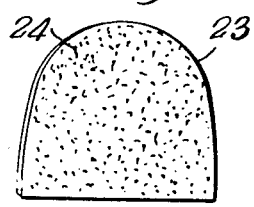

Feb. 13, 1940. A. W. DONOVAN 2,190,512
MANUFACTURE OF FOOTWEAR
Filed Jan. 8, 1938 5 Sheets-Sheet 4
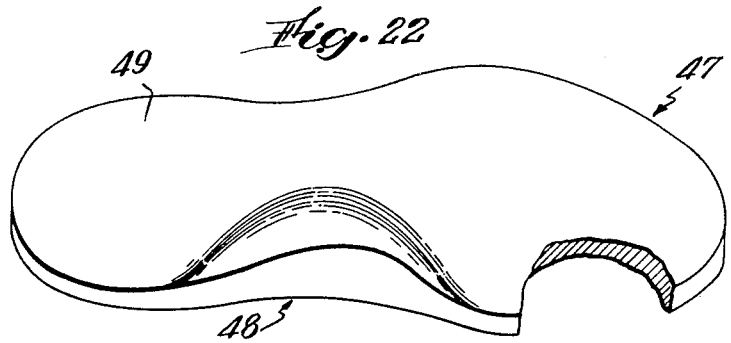
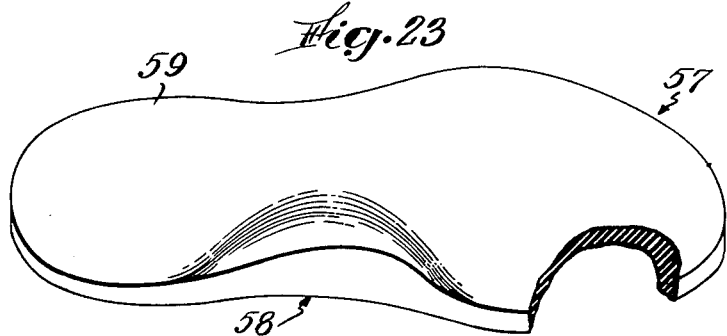
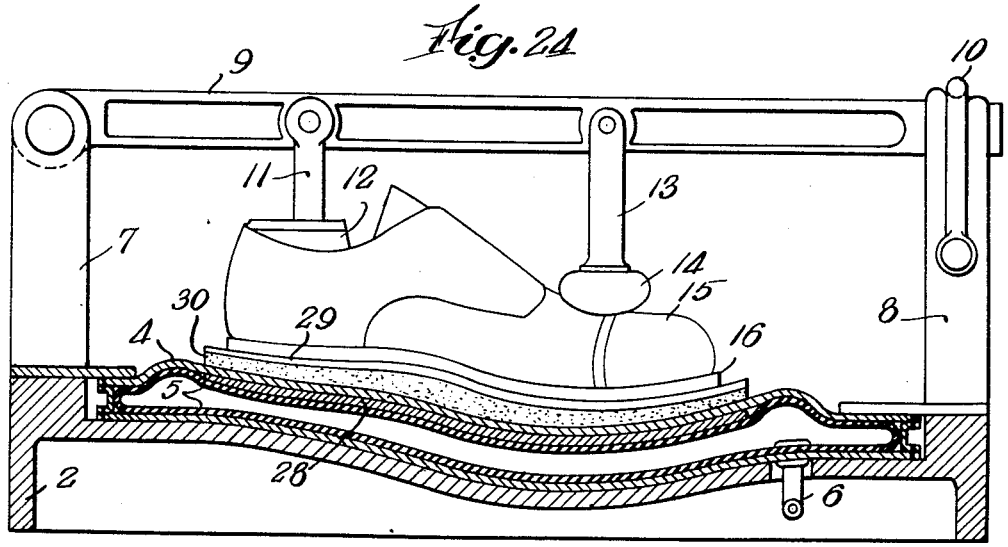
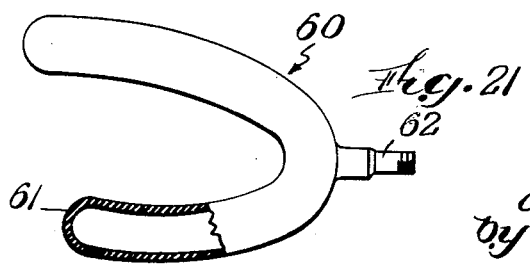
Inventor
Alfred W. Donovan

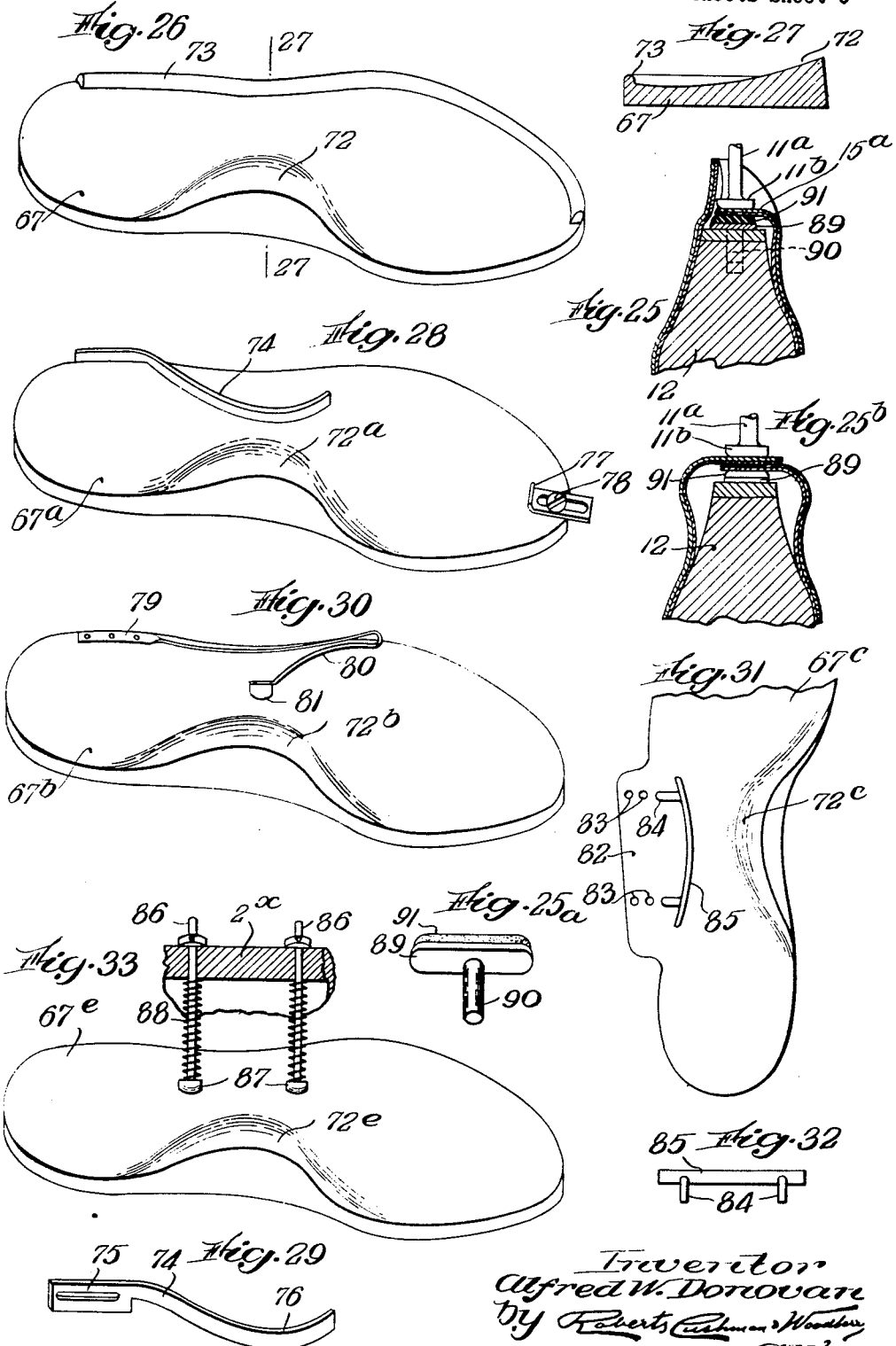

UNITED STATES PATENT OFFICE 2,190,512

MANUFACTURE OF FOOTWEAR

Alfred W. Donovan, Quincy, Mass.

Application January 8, 1938, Serial No. 183,937

17 Claims. (Cl. 12—38)

This invention pertains to the manufacture of footwear and relates more particularly to an improved method of and apparatus useful in applying outer soles to shoes or the like and/or in imparting the desired contour to such soles. In thus referring to the "outer sole," it is thereby intended to designate the outer or wear-receiving element of the shoe bottom structure, whether the shoe have other sole members (for instance an inner sole) or not, the present invention being useful, as to certain at least of its aspects, in the manufacture of shoes of any of the usual types.

Although, as just stated, the invention is of broader utility and application, its use in the manufacture of welt shoes is herein specifically instanced for convenience in illustration and description, but with substantial reference to its employment in the manufacture of shoes of the type of which the outer sole is permanently attached by means of adhesive and which are commonly known in the trade as "compo" shoes.

As is well recognized, the demands of the shoe trade as to minutiae of detail and dimension in the finish of a shoe are quite unreasonable, considering the materials of which a shoe is made, but to suit these requirements of custom, even the bottom or wear-receiving surface of the outer sole must be finished to perfection, often to a mirror-like gloss and to so smooth and even a contour that no irregularity may be observed even when the sole bottom is viewed by light reflected from it at a sharp angle to the surface. In the effort to obtain such a finish, it is customary to scour the exposed surface of the sole with abrasive after leveling, but unless the leveling operation has reduced the sole to a nearly perfect condition, which by reason of the nature of the leveling process is seldom effectively done, it is often necessary to prolong the scouring operation until substantially the entire grain or most wear-resistant layer of the sole has been removed. Obviously the more protracted this scouring operation, the more expensive it must be both in labor cost and in the amount of abrasive used, to say nothing of the subsequent loss in wear thus entailed.

At the time that the leveling operation is performed, the sole is in temper, that is to say, moist enough to be somewhat plastic, and as the leveling operation is carried out by the use of rollers pressed with tremendous force against the sole and guided to move longitudinally of the sole by the operator, the tendency is to flow the sole material in the plane of the sole as well as to press it. Such flow of the material tends to buckle the closed channel flap; to distort the line of stitches so as to impair the ornamental character of the latter when the seam is stitched aloft, that is to say, on the sole surface rather than in a channel; it tends to cause the underlying plastic filler to flow and bunch up and thus produce bulges in the outer sole which can not be removed; it imposes undue stresses on the stitches and tends to cause them to cut the soft sole material; it is not at all effective in eliminating the ridge formed by the closed channel flap; it tends to open the grain by a stretching action rather than to close and compact it, in this respect differing very markedly from the effect of the hammering operation commonly practiced by the custom shoemaker; and at best it is dependent upon the skill and judgment of the operator to produce a bottom surface which conforms in any near degree to the contour desired in the finished shoe.

The present invention has for its principal object the provision of an improved method of and apparatus useful in the manufacture of footwear whereby the above-noted difficulties are avoided and uniformity and perfection of product are substantially insured.

Among the more specific objects of the invention is to provide a method of and apparatus such that the outer soles of all shoes of a given size and style may be made of a substantially uniform predetermined contour; to provide an improved method of and apparatus such that the outer sole of a shoe may be brought to proper shape and condition for finishing without recourse to the usual leveling operation; to provide an improved method of and means for so treating a shoe prior to bottom finishing as to compact the outer sole so that its grain surface is in the best condition for the practice of the finishing operations, and to resist subsequent wear; to reduce the outer sole to a contour, prior to scouring, such as to minimize the amount of scouring necessary or even in some instances to make scouring unnecessary; to provide a method of imparting the desired contour to the outer sole such as to cause the moisture within the outer sole to be driven into its marginal portion thereby to facilitate subsequent operations, for example, rough-rounding, edge-trimming, etc.; to provide an improved method of contouring the outer sole such that the line of sewing stitches will not be disturbed, the bottom filler will not be caused to bunch up, the stitches will not be unduly strained so as to cause them to cut into the outer sole material, and the shank piece will not be disturbed; to provide a method of contouring the outer sole such that when applied to compo shoes the contouring operation will not tend to displace the outer sole with reference to the shoe bottom; to provide a method of uniting the outer sole to the shoe bottom whereby to insure substantial uniformity and security of attachment from in-seam to in-seam, or from edge to edge, so that subsequent operations, for example, rough-rounding or sewing will not seriously separate and displace the sole relatively to the shoe bottom; to provide a method of so contouring the outer sole that, if desired, substantially the entire width of its exposed face may be flat, or, alternatively, to cause the margins of the outer sole to curl outwardly to form a close edge such as is required, for example, in women's shoes of the compo type; to provide a method of so roughening the heel portion of the outer sole, concomitantly with the contouring of the outer sole, as to provide an effective anchorage for the heel; and in general to provide apparatus appropriate for carrying out the several improvements in method herein enumerated.

Other and further objects and advantages of the invention will be pointed out hereinafter in the following more detailed description and by reference to the accompanying drawings wherein:

Fig. 1 is a diagrammatic elevation, partly in vertical section, illustrating a simple form of apparatus useful in the practice of the improved method in accordance with the present invention, and showing a shoe in process of having its outer sole properly contoured;

Fig. 2 is a perspective view showing a contouring form or mould desirable for use in the practice of the present invention;

Fig. 3 is an edge elevation of the form of Fig. 2;

Fig. 4 is a section substantially on the line 4—4 of Fig. 2;

Fig. 5 is a section substantially on the line 5—5 of Fig. 2;

Fig. 6 is a view similar to Fig. 5 but showing an alternative contour at the heel portion of the form;

Fig. 7 is a view similar to Fig. 2 but showing the upper portion only of a contouring form of modified construction;

Fig. 8 is an edge elevation of the contouring form of Fig. 7, with its upper and lower parts separated;

Fig. 9 is a section on the line 9—9 of Fig. 7;

Fig. 10 is a perspective view partly broken away and in section, illustrating a contouring form of still further modified construction;

Fig. 11 is a side elevation of the form of Fig. 10;

Fig. 12 is a section on the line 12—12 of Fig. 10;

Fig. 12ª is a view generally similar to Fig. 12 but showing the provision of heating means;

Fig. 13 is a section on the line 13—13 of Fig. 10;

Fig. 14 is a fragmentary perspective view, partly in section, showing the toe portion of a welt shoe bottom as ordinarily finished and indicating an exaggerated form, the uneven appearance due to the ridge formed by the closed channel flap;

Fig. 15 is a view similar to Fig. 14 showing the improved bottom finish resulting from the present invention;

Fig. 16 is a diagrammatic plan view showing the bottom of a shoe which has been stitched aloft and which has been leveled by the ordinary method and apparatus, showing how the line of sewing stitches may be distorted by the leveling operation;

Fig. 17 is a view similar to Fig. 16, but showing the result of contouring the shoe bottom, in accordance with the present invention, whereby the line of sewing stitches is not at all disturbed;

Fig. 18 is a perspective view of a heel roughing plate which may be used as an adjunct to some of the contouring forms herein disclosed;

Fig. 19 is a diagrammatic side elevation showing a lasted woman's shoe of conventional type and with the outer sole in place and indicating the type of contour form which would be useful with such a shoe;

Fig. 20 is a view generally similar to Fig. 1, but fragmentary in character, and illustrating an arrangement whereby, if desired, the marginal portion of the outer sole may be caused to curl upwardly thereby to form a close edge;

Fig. 21 is a plan view, partly in section, illustrating an inflatable bag forming a part of the apparatus of Fig. 20;

Fig. 22 is a perspective view, partly broken away, illustrating a further modification of the sole-contouring form;

Fig. 23 is a view similar to Fig. 22 but showing a form made of a different material;

Fig. 24 is a view similar to Fig. 1 but showing another method of using the contouring form;

Fig. 25 is a fragmentary transverse vertical section illustrating how the top of a high shoe may be treated (when the shoe is subjected to pressure in apparatus such as that shown in Fig. 1) during contouring of the outer sole;

Fig. 25ª is a perspective view illustrating a pressure-applying pad useful in the method indicated in Fig. 25;

Fig. 25ᵇ is a view similar to Fig. 25, illustrative of another mode of arranging the shoe top;

Fig. 26 is a perspective view of another contouring form provided with shoe-positioning means;

Fig. 27 is a section on the line 27—27 of Fig. 26;

Fig. 28 is a view similar to Fig. 26 illustrative of another type of shoe-positioning means;

Fig. 29 is a perspective view of one element of the form of Fig. 28;

Fig. 30 is a view similar to Fig. 26 illustrating another shoe-positioning device;

Fig. 31 is a plan view of a form provided with still another shoe-positioning device;

Fig. 32 is a view of the positioning device of Fig. 31 removed from the form; and Fig. 33 is a perspective view partly in section, illustrating a contouring form, for example, like that of Fig. 2, in association with shoe-positioning means carried by some other part, for example, the pressure-applying mechanism.

Referring to the drawings the numeral 1 designates a press useful in laying, attaching and/or contouring the outer sole of a shoe. The present invention is not primarily concerned with the specific type of press employed, so long as it be capable of exerting very substantial but preferably somewhat yielding pressure to avoid breaking the last, and of maintaining such pressure for a substantial period of time whereby to accomplish the desired results. Thus, if desired, the present invention may be a mechanically operated device similar in general to a sole-laying press and exerting its pressure through heavy springs, but capable of maintaining such pressure for a considerable time, or it may be a press, as above noted, of any other appropriate type suitable for the purpose. As here illustrated, the press is of the general kind commonly used in permanently securing an outer sole by means of adhesive to a shoe bottom, for example, as practiced in the manufacture of compo shoes.

As shown in Fig. 1, the press comprises a frame or base member 2 which may be an independent unit designed to accommodate a single shoe and which, after the shoe has been introduced and placed under pressure, may be placed on a rack or otherwise disposed of while keeping the shoe parts under pressure for the desired period of time. On the other hand, it may, if preferred, form a permanent part of a sole-attaching machine, either of the kind in which the frame with its superencumbent parts constitutes one of a series, mounted upon a horizontal rotating table; upon a ferris wheel type of support; or upon an endless chain or belt, according to the particular type of mechanism of which the mould or press forms a part. Since the particular mode of supporting the press frame constitutes no essential part of this invention, it is not herein illustrated and needs no further description, it being understood that the press frame here shown is merely by way of example and may be replaced by any of the usual commercial types or such improvements thereon as may hereinafter be perfected.

As illustrated, the press or mould frame comprises the horizontal web 3 which forms a support for a flexible pressure-applying bag 4 usually of leather, and which encloses an impervious bag 5 of rubber or the like, having a nipple 6 by means of which pressure fluid may be introduced.

As shown, the frame of the press also comprises rigid uprights or posts 7 and 8, the upright 7 providing a pivotal support for the swinging jack arm 9 whose free end may be locked to the top of the post 8 by means of a yoke 10. The jack arm 9 is provided with a jack pin 11 designed to enter the spindle socket in the last 12, and is also furnished with a pivoted bracket 13 having a pad 14 which is designed to rest upon the forepart of the upper 15 of a lasted shoe whose outer sole member is indicated at 16. Ordinarily, in securing the outer sole to the bottom of the lasted shoe, in accordance with the compo process, the sole 16 would rest directly upon the upper exposed surface of the bag 4, but in accordance with the present method, whether the press be used for permanently attaching a compo sole; for laying a welt sole; or for imparting the final contour to a sole of any type, there is interposed between the sole 16 and the bag 4 a contouring form for instance the form 17 (Fig. 2) forming an essential feature of the present invention.

One simple type of contouring form is illustrated in Figs. 2 to 6 inclusive. This form comprises a substantially rigid supporting plate 18, the upper or sole-contacting member 19 and interposed spacer material 20. Preferably the supporting plate 18 is of metal, for example steel, sufficiently thick to be substantially rigid and unyielding; and for most purposes this plate may be substantially flat or at most, curved slightly in a longitudinal direction generally following the longitudinal contour of the last bottom. On the other hand, the upper surface of the rigid plate 19 is given a contour which is as nearly as practical the exact complement of the contour of a finished outer sole of a theoretically perfect configuration relative to the particular last on which the shoe was lasted. Preferably this member 19 is of a mouldable material which is normally substantially rigid and which normally has a hard, substantially smooth surface, but which may be obtained in a mouldable or plastic condition or reduced to such condition by proper treatment. Thus, for example, the member 19 may be a metal which may be moulded while fluid; a material such, for example, as Celluloid, which may be made plastic by suitable treatment with a solvent or by the use of heat and moisture; or it may be one of the synthetic resins capable of being moulded but which, after moulding, becomes hard and irreversible in phase.

The members 18 and 19 are held in properly spaced relation by the material 20 which may be of any desired character so long as it be substantially rigid and unyielding so as to support the member 19 against deformation, and to transmit pressure from the member 18 to the member 19 without crushing or flowing. Preferably the material 20 is of an inorganic nature in order to reduce weight, for example, this material may be leather; indurated fiber or some cellulose derivative, for example, regenerated cellulose having the proper physical characteristics. However, it is contemplated that this spacer material may be of a nature such that in plastic condition it may be filled into the space between the members 18 and 19 and then allowed to become hard and rigid. For example, certain compounds of plaster of Paris and glue, or the material known as plastic wood (which comprises wood dust mingled with a solution of cellulose acetate or nitrate) may be employed for the purpose. As illustrated, the parts 18, 19 and 20 are united rigidly together by means of rivets 21.

As shown in Figs. 3 and 4, the sole-contacting member 19 is provided (at the inner side of its shank portion) with a substantial elevation 22 complemental to the pronounced upward elevation of the inner edge of the outer sole of a shoe of the arch-supporting type, but it is to be understood that this high elevation at this point is shown merely for illustrative purposes and may not be requisite when the device is used in the manufacture of shoes of other kinds.

As illustrated in Fig. 5, the rear or heel portion of the member 19 is substantially flat transversely, whereas in Fig. 6 an alternative construction is shown in which the contouring form comprising the parts 18ᵃ, 19ᵃ and 20ᵃ has a concave curvature at the heel portion thereby to provide a convex heel seat surface on the shoe sole.

As above noted, the sole-contacting surface of the member 19 is designed to be as nearly as possible the exact complement of the surface of the outer sole of a theoretically perfect shoe made upon a given last. One suggested mode of obtaining such a contour would be to make a shoe upon the selected last in accordance with usual methods and following the best shoe making practice, and then to finish the exposed surface of the outer sole with the most meticulous care and preferably by hand, thereby to obtain a shoe having a sole surface as nearly perfect in contour and finish as it is practically possible to obtain. This finally finished surface is then used, in accordance with any desired and usual mode of procedure, as a primary matrix for moulding the exposed surface of the member 19 to the proper contour. Ordinarily it may not be possible to use the shoe sole itself as the matrix for directly moulding the member 19 (by reason of the character of the material of which the latter is made) but by proper care it is possible to reproduce in the member 19 the configuration of the "perfect" outer sole surface with great exactitude, but with the understanding that the member 19 is the complement of the sole surface, that is to say, it is the intaglio of which the sole itself is the cameo replica. Doubtless other modes than that just suggested may be found for reproducing in the member 19 the contour of the perfected outer sole, and it is understood that this invention is not necessarily limited to the method of or means by which this reproduction of the contour is obtained.

Having prepared the contouring form 17, for example, as shown in Fig. 2, and assuming that it is to be employed for imparting the final finished contour to an outer sole already attached in one way or another to a lasted shoe, it is preferred, as shown in Fig. 1, to mount the contouring form 17 upon the upper surface of the bag 4 of the press 1 and then, having properly tempered the outer sole 16, to place the latter upon the exposed upper surface of the member 19 of the form, and to bring the jack bar 9 with its parts 11 and 13 down into operative relation to the shoe and last and to clamp the bar in place by means of the latch 10. Pressure fluid is then admitted through the nipple 6 into the bag 5, thereby applying very substantial pressure against the under surface of the contouring form. By reason of the application of pressure by means of a fluid, the pressure is exerted substantially uniformly upward at all points of the form, the force being directed substantially normally to the exposed surface of the shoe sole. The pressure is transmitted from the rigid supporting plate 18, through the rigid spacer material 20, to the rigid contouring or sole-engaging element 19, and since the sole is in temper and the fluid pressure is of substantial amount, for instance from 65 to 90 pounds per square inch, the material of the sole is moulded to substantially the exact surface configuration of the part 19. During this moulding or squeezing operation the moisture in the tempered sole is caused to flow outwardly toward the margins of the sole, and if the shoe be left in the press for a sufficient period of time, for example for good practice from six to ten minutes, although reasonable results may be obtained in a shorter or longer time, it is found that when the shoe is ultimately removed from the press the sole material will have taken a substantially permanent set, with its outer surface of a contour which is substantially the exact complement of the upper surface contour of the member 19. Since, as above described, this member 19 is made from as nearly perfect a finished outer sole as is practical, the result is that the contour of the shoe, after being subjected to pressure, very nearly approaches the theoretically perfect finished sole contour, and since each successive shoe of a lot being made will be caused to engage the same or a like contouring form, it is obvious that all of the resulting shoes will have soles of substantially the same exact contour, something which has not heretofore been capable of performance by any ordinary commercial mode of making and finishing shoes.

Since the moisture is forced out toward the margins of the sole in this process, these margins are placed in the best possible condition for any subsequent operation which involves cutting or piercing the material of such margin, for example, such operations as rough-rounding or stitching. Furthermore, as the sole is conformed to the desired shape by pressure which is exerted substantially normal to the surface of the sole, there is no tendency to flow the sole material in its own plane and thus to distort sewing stitches which may be exposed on the surface of the sole or to open up the grain. On the contrary this operation compacts the material of the sole so that the grain surface becomes very hard and close and is in the best possible condition for such further finishing operations as may be required and to resist wear.

Referring to Figs. 14 to 17, certain results of the present method are shown as compared with the ordinary results. In Fig. 14, which shows the toe portion of the outer sole of an ordinary welt shoe having the sewing stitches disposed in a channel, the character 16$^a$ designates the sole, 16$^b$ the channel, and 16$^c$ the channel flap. When a shoe of this type is leveled in accordance with the usual methods, there remains a slight elevation, as indicated in exaggerated form at 16$^e$ along the line where the channel flap joins the body of the sole. This line is readily visible by light reflected from the sole at a sharp angle, and apparently can not be eliminated with any degree of success in accordance with the usual prior methods of manufacture. However, as compared with this prior effect, a sole 16$^x$, as shown in Fig. 15, having the closed channel flap 16$^y$, when subjected to the contouring process of the present invention, exhibits a substantially smooth bottom surface 16$^z$ almost entirely free from any such light reflecting ridge or elevation as that shown at 16$^e$ in Fig. 14. In fact a welt shoe having its seam disposed in a channel and contoured in accordance with the present process can not ordinarily be distinguished from a shoe whose outer sole is attached by means of adhesive alone.

In Fig. 16 an outer sole 16$^m$ is shown as provided with a sewed seam 16$^n$ stitched aloft, that is on the surface of the sole, in accordance with certain modes of manufacture, but showing the irregularity of the seam which sometimes results from the action of the ordinary leveling machine. As is well known, the leveling machine acts by a rolling of the sole, and, since the sole is in temper, the material of the sole tends to flow and thus carry with it the stitches, or to cause the stitches to cut into the sole and thus destroy the effectiveness of the seam. As compared with this, the sole shown at 16$^s$ in Fig. 17 (contoured in accordance with the present process) has the sewed seam 16$^t$ which extends accurately parallel to the edge of the sole throughout its extent, thus providing the desired ornamental appearance and with no distortion of the stitches or tendency to cause them to cut into the material of the sole.

As adjunctive to the above process of contouring the outer sole, it is contemplated that the heel seat surface of the outer sole may be roughed concomitantly with the contouring operation. For this purpose, as illustrated in Fig. 18, a roughening plate 23, shaped to cover the heel seat of the outer sole, may be provided, such plate having a distinctly rough surface 24 formed for example by knurling or the like, the plate 23 being of rigid material, for example steel. However, a piece of coarse sand paper or the like may be used. This plate is interposed between the shoe sole and the contouring member 19 before the pressure is applied, and during the application of pressure the roughnesses 24 of the member 23 bite into the heel seat surface of the outer sole, thus roughening the latter and providing a very firm anchorage for the cement employed in uniting the heel to the sole.

In this connection it may be noted that the plate 23 acts, in a sense, as an embossing member, and it is thus obvious that if it were desired to give the entire sole of the shoe, or any selected portion thereof, a particular ornamental or other surface finish other than plain, the desired pattern might be developed either in cameo or intaglio upon the upper surface of the member 19, thereby, during the contouring operation, impressing such pattern in the surface of the outer sole. Likewise it is obvious that the roughness 24, instead of being made upon a separate plate 23, might be provided upon the heel portion of the contouring form itself.

After the outer sole has been subjected to the action of the contouring form and has been removed from the press, it may be finished in any desired way, but it is to be noted that by reason of the perfection of contour already imparted upon it, comparatively little scouring is necessary to bring the sole to the final condition ready for application of such finishing media, for instance varnish, wax or the like, as may be employed. In fact the scouring should ordinarily be as little as possible, so as merely to provide the desired surface color or appearance, and should obviously be so carried out as not to change the contour already impressed upon the sole material.

While, as illustrated in Figs. 2 to 6, the plate 18 is not curved substantially (the form shown in these figures being intended for use with a man's shoe) it may be desirable when the form is used for contouring a woman's shoe, to give a greater or more abrupt longitudinal curvature to the supporting member of the form. Thus as illustrated in Fig. 19, the contouring form comprises the supporting plate 18$^x$, the sole-contacting member 18$^y$ and the spacer material 18$^z$, the entire form being longitudinally curved quite sharply to conform to the sole 16' of a woman's shoe 15' mounted upon the last L'.

While as above described, the form 17 includes parts 18, 19 and 20, all permanently united and forming a substantially rigid unitary structure, it may be preferred for certain purposes to make the form as illustrated in Figs. 7, 8 and 9, for example. In these figures the form 27 is shown as comprising a support or base plate 28 (Fig. 8) generally similar to the plate 18 above described, and preferably of a rigid material, but in this case the plate 28 is separate from and independent of the upper part comprising the elements 29 and 30. In this instance the elements 29 and 30 are permanently united together, for example, by a suitable cement or otherwise, the part 29, if desired, being of a slightly flexible material, for example, Celluloid, and the material 30, particularly at the forepart, being also slightly flexible. However, the parts 29 and 30 may be rigid if desired. As illustrated in Fig. 7, the upper or sole-contacting surface of the member 29 is smooth and glossy, for although a reasonably smooth surface appears to provide a very desirable contouring effect, it is found for some purposes that if the contouring form have a smooth and polished or glossy sole-contacting surface, the outer sole may be so finished during the contouring operation that no further finishing is necessary. The form shown in Figs. 7 and 8 may be used in various ways, some of which will be referred to hereinafter more fully, it being evident that the combined members 29 and 30 may be used as a unit without the member 28, if desired, or that the member 28 may be associated with them, as hereinafter described, before pressure is applied.

When the parts 29 and 30 are of somewhat flexible material the result of applying pressure is to tend to curl the margins of the contouring form (particularly at the forepart) upwardly with reference to the central portion, and thus to bend the marginal portion of the sole upwardly into close engagement with the upper material of the shoe, thus assisting in providing a very close edge. This may be of advantage in the manufacture of compo shoes wherein the present contouring step is employed, or in laying the soles of welt shoes so as to insure a uniform adhesion of the sole from in-seam to in-seam.

When the contouring form of Figs. 7, 8 and 9 is employed, particularly for permanently uniting a cemented outer sole or for laying a welt sole, the plate 28 may rest upon the leather bag 4, as illustrated in Fig. 20, and if it be desired to accentuate the upward curl of the edge of the outer sole, so as to insure a close edged shoe or proper adhesion from in-seam to in-seam, it is proposed to provide an inflatable bag 60 (Fig. 21) preferably of more or less U or horseshoe shape and having a filling nipple 62, and of such outer contour and dimensions as to conform more or less in outline to the marginal portion of the toe and forepart of the shoe sole. This bag may then be interposed between the forepart of the plate 28 (Fig. 20) and the element 30 of the upper part of the form and after the shoe has been placed in the press, this bag 60 may be inflated by means of suitable pressure fluid, so as to form a marginal ridge more or less following the contour of the forepart of the shoe sole. Pressure is also applied by means of the bag 5 and in so doing the sole is contoured and pressed with great uniformity against the under surface of the lasted shoe, and at the same time the marginal portion of the outer sole is forced very firmly upwards substantially into contact with the lower part of the lasted upper.

In Figs. 10, 11, 12 and 13, a further embodiment is illustrated wherein the contouring form 37 comprises a rigid, preferably metallic, supporting plate 38, a rigid and usually metallic sole-contacting member 39, and rigid struts 40 and 40$^a$ interposed between the members 38 and 39, the parts all being permanently united by means of rivets 41, welding, or the like. This arrangement provides an extremely rigid construction but without unduly increasing the weight of the form such as to make it difficult to handle.

In Fig. 12$^a$, the form 39$^x$, which may be generally like form 39 if desired, is provided with heating units H (for instance electrical resistance coils) supplied with current by a flexible conductor C. By heating the contoured upper member of the form, the time necessary to contour the sole may sometimes be reduced.

In Fig. 22 there is shown a contouring form 47 consisting of a unitary piece of cast metal having the lower more or less flat surface 48 designed to rest upon the inflatable bag or other platen of the press, and the upper contoured surface 49 designed to engage the shoe sole. In Fig. 23 there is illustrated a form 57, also of integral unitary construction, moulded from an organic material, for example hard rubber, synthetic resin or the like, having the lower surface 58 designed to rest upon the inflatable bag of the press and the upper contoured surface 59 designed to engage the shoe sole.

In accordance with another mode of procedure, as illustrated in Fig. 24, the member 28 of the contouring form 27 is disposed between the leather bag 4 and the rubber bag 5 so as, in effect, to become a permanent part of the press. In this case the operator is not required to handle the part 24, thus relieving him of moving this heavy part about. The member 30 is then placed directly upon the leather bag and the plate 28 serves to transmit pressure from the rubber bag to the leather bag, and thence to the member 30.

When the contouring form has a substantial elevation at its inner side at the shank, there is a slight tendency for the shoe or the sole to slip laterally down the slope of this elevation when it is being placed in the press. To avoid this, sole-positioning means may be provided as illustrated for example in Figs. 26 to 33, respectively. In Fig. 26 the contouring form 67, having the elevation 72 at its inner edge, is furnished at its opposite edge with a permanent marginal rib 73, designed to engage the edge of the outer sole, and thus to hold it in proper position on the contouring form. As shown, this rib 73 extends about the toe so as also to position the sole lengthwise of the form. It is obvious that if such a rigid guard or positioning member be employed, the outer sole must be one which has been reduced nearly to final dimensions before the contouring operation, but in accordance with some modes of manufacture it is common to shape the outer sole substantially to its final dimensions before uniting it to the other parts of the shoe.

In Figs. 28 and 29 the contouring form 67a, having the elevation at 72a, is shown as provided with a resilient sole-positioning member 74 consisting of a length of spring material having one end 75 slotted for the reception of fastening means whereby it is attached to the edge of the form, and having its free end 76 smoothly curved for engagement with the shank portion of the outer sole. This form 67a is also shown with an adjustable sole-positioning member 77 at its toe end, designed to position the sole longitudinally of the form,—such positioning member having an elongated slot for the reception of an attaching screw 78 by means of which it may be adjustably held in position.

In Fig. 30 the contouring form 67b, having the elevation 72b at its inner side, is furnished with a resilient sole-positioning member in the form of a hairpin spring secured at 79 to the form, and having its free end portion 80 directed inwardly toward the elevation 72b and furnished with a pad 81 at its extremity, for engagement with the sole member.

In Figs. 31 and 32 the form 67c, having the elevation 72c at its inner edge, is shown as provided with a lateral offset 82 at its opposite or outer edge having a series of positioning sockets 83 designed for the reception of pins 84 projecting from a bodily movable guard member 85 (Fig. 32). This guard member may be moved toward and from the elevation 72c of the form by lifting it and disposing its pins 84 in the corresponding selected sockets 83.

In Fig. 33 the form 67e is shown as having the elevation 72e at its inner part, but in this case the sole-positioning means forms a part of the press structure rather than of the form. In this view the character 2x indicates a portion of the press frame, this portion having guide openings for a pair of sliding rods 86, each provided with a sole-engaging pad 87 at its outer end, and being embraced by a spring 88 which tends to move the pad toward the elevation 72e of the form. This arrangement is obviously useful with forms which are not themselves furnished with sole-positioning elements.

In view of the fact that existing machines, designed to use or comprising presses such as the press herein illustrated, have heretofore been universally dimensioned for use with low shoes, and whereas the present mode of laying, uniting, and/or contouring the shoe bottom is equally useful with high shoes as with low shoes, the present invention contemplates a procedure by which a high shoe may have its sole compressed by the use of the contouring form of the present invention and in a press of the usual dimensions. Thus, as illustrated in Fig. 25, the jack rod 11a of the press is furnished at its lower end with a pad 11b which is designed to rest upon the shoe top material which has been folded over, as shown at 15a, across the top of the last. In order to prevent the upper material from being forced into the socket opening in the last, it is preferred to provide an upper supporting pad 89 (Fig. 25a) such pad being furnished with a pin 90 intended to set into the last socket and having a resilient cushion member 91 designed to underlie the folded-over upper material. With this arrangement the necessary pressure may be applied to the shoe without damaging the upper material and without necessitating the use of a press 1 of unusual size, such as could not be employed in sole-attaching machines of the usual commercial type.

Fig. 25b shows an alternative mode of folding the top of a high shoe while the sole is being subjected to pressure, the top material at opposite sides of the upper being turned in and overlapped on the pad 91.

As already intimated, the contouring form of the present invention finds utility both in the manufacture of shoes of the compo type, in which the outer sole is permanently secured by means of cement only, and in shoes of other types, for example welt shoes. When used in the manufacture of shoes of the compo type, the contouring form serves not only to transmit the necessary pressure for causing the adhesive firmly and uniformly to unite the outer sole to the bottom of the lasted shoe, but at the same time it imparts to the outer sole the final and substantially finished contour desired.

When used in the manufacture of welt shoes, the contouring form may be used both for laying the soles and for imparting the final contour. When used for laying the sole, the highly advantageous application of pressure provided by the contoured sole-contacting member insures a substantially uniform adhesive of the sole to the bottom material at least from in-seam to in-seam, so that when the shoe is subjected to the later operations of rough-rounding and stitching it is so firmly united from in-seam to in-seam that even though the margins may be lifted from the bottom, the material between the in-seams is not disturbed. On the other hand, when the contouring form is used to impart the final shape to the welt shoe after the outer sole has been sewed in place, it thoroughly compacts the outer sole material, eliminates the channel flap ridge, and otherwise reduces the sole surface substantially to the final finished contour.

While the utility of the invention in connection with the manufacture of shoes of the compo and welt types has been specifically suggested, it is obvious that the invention is equally applicable to shoes of the other types, for example McKays, stitch-downs, turns, and shoes made by the Littleway process, or in fact to any type of footwear in which it is desirable to impart an accurate finished contour to the exposed sole member.

While certain desirable contouring forms have been herein illustrated by way of example, and certain materials useful for the purpose have been mentioned, and while one form of press useful for carrying out the method has been illustrated, it is to be understood that these specific references are merely by way of example and illustration, and are not intended in any way to limit the scope of the invention, as defined in the appended claims.

I claim:

1. Method of imparting to the forepart and shank portions at least of the outer sole of a shoe substantially that surface configuration which is desired in the finished shoe, which comprises as steps providing a rigid contouring form having a surface which is substantially the exact complement of the desired final finished surface of the outer sole, disposing the outer sole against the bottom of a lasted shoe previously made ready for the reception of the outer sole, disposing the contouring form in contact with the outer sole and pressing the form with heavy pressure against the outer sole thereby to impart the desired surface configuration to the outer sole, and while so applying pressure roughening the heel seat surface of the outer sole.

2. Method of uniting and contouring a shoe outer sole already assembled with an inner sole and the upper material upon a last, and with an adhesive medium interposed between the outer sole and the adjacent portions of the shoe bottom, thereby to impart to the outer sole substantially that surface contour which is desired in the finished shoe, said method comprising as steps providing a contouring form of such rigidity as to preserve its initial configuration regardless of the shape of the sole against which it is pressed, said form having a glossy surface whose contour is substantially the exact complement of that which it is desired to impart to the outer surface of the outer sole, pressing said form against the exposed surface of the outer sole in a direction substantially perpendicular to said exposed surface thereby to conform said surface to the contour of the form, and maintaining such pressure until the adhesive has permanently set.

3. Method of imparting to the outer sole of a shoe after its attachment to the other parts of a shoe substantially that surface configuration desired in the finished shoe, which comprises as steps placing the exposed surface of the previously tempered sole in contact with a contouring form of such rigidity as to preserve its initial configuration regardless of the shape of the sole against which it is pressed, said form having a glossy surface which is substantially the exact complement of the desired configuration of the forepart and shank portions at least of the sole member but which has a rough surface at its heel end, and moving the sole and form toward each other under pressure sufficient to mould the sole material to the shape of the form and concomitantly to roughen the heel seat surface of the sole.

4. Method of uniting an outer sole to the bottom of a high-topped shoe by the use of adhesive and pressure, which comprises associating the lasted shoe with an outer sole having adhesive interposed between them, placing a pad upon the top of the last to cover the spindle hole in the latter, folding the material of the top of the upper over onto the pad, applying an abutment member to the folded-over upper member thereby to resist upward movement of the last, and applying and maintaining pressure against the exposed surface of the outer sole thereby to cause the adhesive to unite the sole to the shoe bottom.

5. A contouring form for use in imparting to the forepart and shank portions at least of the outer sole of a shoe substantially that surface contour which is desired in the finished shoe, said form being of a material which is a cellulosic derivative so stiff, rigid and unyielding that it preserves its initial contour regardless of the shape of the sole against which it may be pressed, said form having a glossy sole-contacting surface so configured as to be substantially the exact complement of the desired finished contour of the sole of the completed shoe, and heating means arranged to heat the sole-contacting surface of the form.

6. A contouring form for use in moulding the exposed surface of the outer sole member of a lasted shoe, said form being of substantially rigid material and having a sole-contacting surface which, throughout the shank and forepart portions is smooth and so configured as to be substantially the exact complement of the desired contour of the shank and forepart portions of the finished shoe sole, the heel portion of said form being distinctly rough thereby to roughen the heel seat portion of the sole.

7. A contouring form for use in moulding the exposed surface of the outer sole member of a lasted shoe, said form being of substantially rigid material and having a rigid supporting member of a relatively flat surface configuration and a substantially rigid sole-contacting element having a surface configuration which is substantially the exact complement of the shape of the sole member of a theoretically perfect shoe made upon said last, and substantially rigid material interposed between said support and the sole-contacting element.

8. A sole-contacting form for use in moulding an outer sole assembled with a lasted shoe upper, said form comprising a rigid sole-contacting member which is substantially the exact complement of the desired finished configuration of the exposed surface of the sole, and a supporting member which is relatively flat, and heating means arranged to heat the sole-contacting surface of the form.

9. A sole-contacting form for use in moulding an outer sole assembled with a lasted shoe upper, said form comprising a sole-contacting member which is substantially the exact complement of the desired finished configuration of the exposed surface of the sole, and a supporting member which is relatively flat, the sole-contacting surface being substantially smooth, and a heel seat roughening element having a distinctly rough surface, said roughening element resting upon the rear portion of the sole-contacting member of the form, and by contact with the heel seat portion of the sole roughening the latter.

10. A sole-contacting form for use in imparting to the forepart and shank portions at least of the outer sole of a shoe substantially that surface configuration which is desired in the finished shoe by direct pressure of the form against the sole surface in a direction substantially normal to said surface, said form comprising a sole-contacting portion having a smooth and glossy sole-engaging surface which is substantially the exact complement of the desired finished configuration of the exposed surface of the sole, and means providing a rigid substantially unyielding backing for said sole-engaging surface, thereby to preserve the initial configuration of said sole-engaging surface regardless of the shape of the sole against which the form is pressed.

11. A sole-contacting form for use in moulding an outer sole assembled with a lasted shoe upper, said form comprising a sole-contacting member which is substantially the exact complement of the desired finished configuration of the exposed surface of the sole, and a rigid supporting member which is relatively flat, and substantially rigid spaced struts interposed between said members, said struts being operative to transmit mounding pressure from the supporting member to the sole-contacting member.

12. A sole-contacting form for use in imparting to the forepart and shank portions at least of the outer sole of a shoe substantially that surface configuration which is desired in the finished shoe, said form comprising a sole-contacting member of such rigidity as to preserve its initial configuration regardless of the shape of the sole against which it is pressed, said member having a sole-contacting surface which is substantially the exact complement of the desired finished configuration of the exposed surface of the sole, and means operative to position the sole laterally with reference to the inner edge of the form, said positioning means being constructed and arranged to accommodate soles of different sizes.

13. A sole-contacting form for use in moulding an outer sole assembled with a lasted shoe upper, said form comprising a sole-contacting member which is substantially the exact complement of the desired finished configuration of the exposed surface of the sole, and a yieldable guard member comprising a length of resilient metal secured to the form adjacent to the outer edge of the latter, said guard being engageable with the outer edge of the sole to prevent the latter from moving away from the inner edge of the form.

14. A sole-contacting form for use in moulding an outer sole assembled with a lasted shoe upper, said form comprising a sole-contacting member which is substantially the exact complement of the desired finished configuration of the exposed surface of the sole, and a bodily movable guard member having parts selectively engageable with a plurality of positioning elements carried by the form, said guard being operative by engagement with the outer edge of the sole to position the latter properly widthwise of the form.

15. A sole-contacting form for use in imparting to the forepart and shank portions at least of the outer sole of a shoe substantially that surface configuration which is desired in the finished shoe, said form comprising a sole-contacting member of such rigidity as to preserve its initial contour regardless of the shape of the sole against which it may be pressed, said member having a sole-engaging surface which is substantially the exact complement of the desired finished configuration of the exposed surface of the sole, and guard means operative to position the sole both laterally and longitudinally of the form, said guard means being constructed and arranged to accommodate soles of different sizes.

16. A pressure-transmitting device for use in a sole press of the type commonly used in cement-attaching outer soles to the bottoms of lasted shoes in accordance with the compo process, said press having a jack for engagement with the last and an inflatable bag for exerting pressure against the sole, said pressure-transmitting device comprising a substantially rigid structure designed to rest upon the inflated bag of the press and having a sole-contacting surface contoured to a configuration which is substantially the exact complement of the desired surface contour of the sole of the completed shoe, and a resilient guard means constructed and arranged to overlie the sole-contacting member and to position the sole thereon laterally with reference to the inner edge of the sole-contacting member.

17. In combination with a sole press of the type commonly used in cement-attaching outer soles to the bottoms of lasted shoes in accordance with the compo process, said press having a jack including a last-engaging member and an inflatable bag for exerting pressure against the sole, a pad resting upon the top of the rear part of the last and covering the spindle hole in the latter, said pad having a yieldable surface to form a support for the top of the upper of a high shoe folded over upon said pad to receive the pressure of the last-engaging member of the jack.

ALFRED W. DONOVAN.